(No Model.)
G. H. REYNOLDS.
TOOTHED GEARING.
No. 342,134.   Patented May 18, 1886.
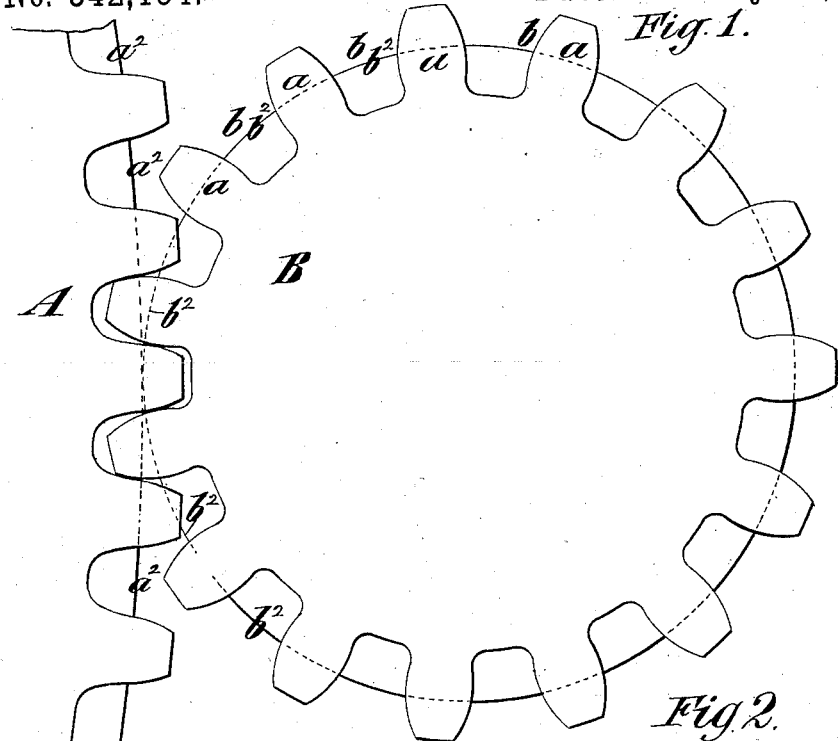
Fig. 1.
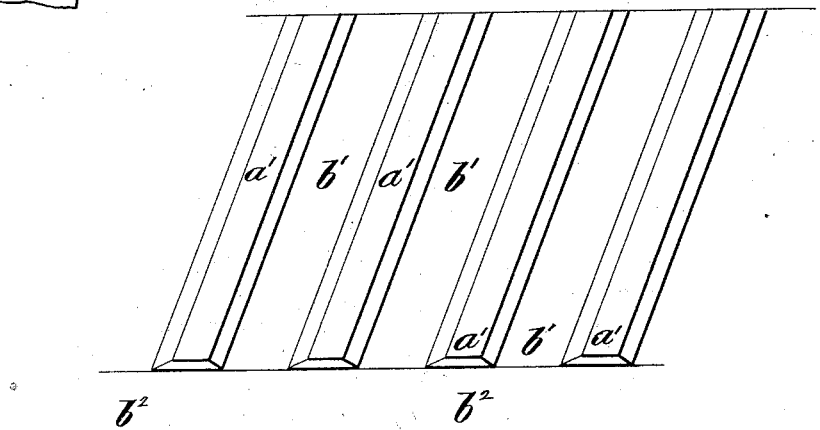
Fig. 2.
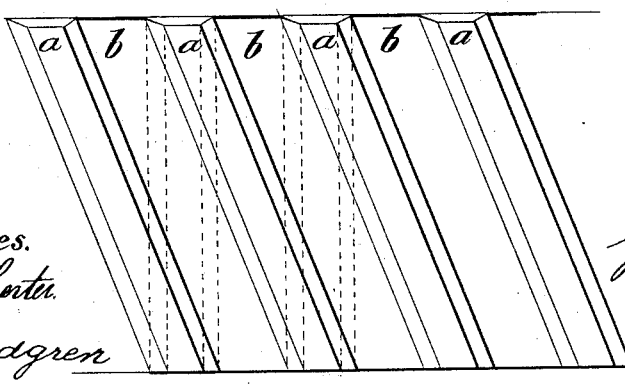
Witnesses.
Emil H. Hunter.
C. E. Sundgren.
Inventor.
Geo. H. Reynolds
by his Attys
Brown & Hall

UNITED STATES PATENT OFFICE.

GEORGE H. REYNOLDS, OF NEW YORK, N. Y., ASSIGNOR OF ONE-HALF TO CRANE BROTHERS MANUFACTURING COMPANY, OF CHICAGO, ILLINOIS.

TOOTHED GEARING.

SPECIFICATION forming part of Letters Patent No. 342,134, dated May 18, 1886.

Application filed February 13, 1886. Serial No. 191,798. (No model.)

*To all whom it may concern:*

Be it known that I, GEORGE H. REYNOLDS, of the city and county of New York, in the State of New York, have invented a new and useful Improvement in Toothed Gearing, of which the following is a specification.

My invention is applicable to toothed gearing for various purposes, but is especially useful for gearing used to transmit motion from engines to elevators, and where a smooth and steady motion without shock or jar is much to be desired.

Gearing having teeth oblique to the width of the face has been used, and "herring-bone" teeth, in which two oblique tooth portions extending at opposite angles and joined at their points of convergence, are also old.

The object of my invention is to provide gearing which will operate with a more smooth and constant force than the kinds above described; and the invention consists in a spur-gear wheel having two series of teeth arranged side by side and extending obliquely at opposite angles, the teeth of each series being stepped relatively to or arranged opposite the spaces between the teeth of the other series.

The invention also consists in a gear-wheel of the character above described, having a cylindric bearing portion of the pitch-diameter between the series of teeth, so that when two wheels of the kind described are geared together, their cylindric bearing portions will roll together, or one on another.

The invention also consists in a wheel having two series of oblique teeth extending at opposite angles and stepped relatively to each other, as above described, the teeth of each series having an inclination equal to their pitch, so that each tooth at one end is in line across the face of the wheel with the other end of the tooth next adjacent in the series.

In the accompanying drawings, Figure 1 is a side view of a small wheel or pinion and a portion of a larger wheel embodying my invention, and Figure 2 is a plan view of a portion of the circumference of the wheel.

Similar letters of reference designate corresponding parts in both figures.

A designates the portion of a large wheel, and B is a smaller wheel or pinion engaging therewith and having teeth similar thereto.

In Figure 2 I have represented a number of the teeth of the gear as they would appear in plan view. The teeth are arranged in two circular series around the circumference of the wheel, $a$ $a'$ designating the teeth of the two series and $b$ $b'$ the spaces between these teeth. As clearly shown, the teeth of these two series extend obliquely, at opposite angles relatively to each other, across the face of the wheel. As here shown, the inclination of each tooth $a$ $a'$ is equal to the pitch; or, in other words, one end of each tooth is in line across the wheel with the opposite end of the tooth next adjacent thereto in the series, as is shown by the dotted lines in Fig. 2.

The teeth $a$ of one series are stepped relatively to the teeth $a'$ of the other series, or, in other words, are arranged opposite the spaces $b'$, between the teeth $a'$ of the other series.

Between the two series of teeth of the wheel and pinion I have shown cylindric bearing-surfaces $a^2$ $b^2$, which, as shown in Fig. 1, are of the same diameter as the pitch-line of the wheel, and have a rolling contact one with another when the wheels are running in gear.

By the arrangement and construction of teeth described a very smooth and regular transmission of power, without shock or jar, is obtained, and the cylindric bearing-surfaces $a^2$ $b^2$ also conduce to this same end.

What I claim as my invention, and desire to secure by Letters Patent, is—

1. A spur-gear wheel having two series of teeth arranged side by side and extending obliquely at opposite angles, and having the teeth of each series stepped relatively to or arranged opposite the spaces between the teeth of the other series, substantially as herein described.

2. A spur-wheel having two series of teeth separated by a cylindric bearing portion of the same diameter as the pitch-line and extending obliquely at opposite angles, and having the teeth of each series stepped relatively to or arranged opposite the spaces between the teeth of the other series, substantially as herein described.

3. A gear-wheel having two series of teeth arranged side by side, extending obliquely at opposite angles and stepped relatively to each other, as described, the teeth of each series having an inclination equal to their pitch, so that each tooth at one end is in line across the face of the wheel with the opposite end of the tooth next adjacent in the series, substantially as herein described.

GEO. H. REYNOLDS.

Witnesses:
C. HALL,
FREDK. HAYNES.